(12) United States Patent
Wiklund

(10) Patent No.: US 6,452,926 B1
(45) Date of Patent: Sep. 17, 2002

(54) RELIABLE AND ROBUST ATM-SWITCH

(75) Inventor: Göran Wiklund, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/356,026

(22) Filed: Jul. 16, 1999

(30) Foreign Application Priority Data

Jul. 17, 1998 (SE) .............................................. 9802582

(51) Int. Cl.$^7$ .............................................. H04Q 11/00
(52) U.S. Cl. ..................... 370/388; 370/217; 370/395.1
(58) Field of Search ................................ 370/386, 387, 370/388, 395, 394, 396, 397, 217, 218, 216, 219, 220, 357, 359, 389, 395.1

(56) References Cited

U.S. PATENT DOCUMENTS

| | | | |
|---|---|---|---|
| 4,955,016 A | * | 9/1990 | Eng et al. ..................... 370/60 |
| 5,471,460 A | * | 11/1995 | Tanabe .......................... 370/16 |
| 5,604,734 A | * | 2/1997 | Buhrgard ..................... 370/338 |
| 5,631,902 A | * | 5/1997 | Yoshifuji ..................... 370/388 |
| 6,157,643 A | * | 12/2000 | Jian Ma ..................... 370/389 |

\* cited by examiner

*Primary Examiner*—Ricky Ngo
(74) *Attorney, Agent, or Firm*—Nixon & Vanderhye P.C.

(57) ABSTRACT

An ATM-switch is built in tree stages, each consisting of a plurality of switch cores. Each switch core in the first stage is duplicated to form a redundant pair of planes operating independently of each other. A cell from an input unit is thus sent to both planes in such a pair. All the switch cores in this stage work in a distributed mode, distributing a cell incoming to one of its input ports to a random one of its output ports. A plane selection is made after each such pair of switch cores. In that way the cells are also distributed at random to all switch cores in the middle stage. This stage acts in a load-sharing way, in which the switch cores act in the conventional switching way and thus the switch cores are not duplicated. A rather high number of switch cores should be used in this stage since, in the case of a faulty switch core in the middle stage, the remaining switch cores have to carry all the traffic of cells. The switch cores of the second stage will direct the cells to the coffect switch core of the third stage. The third stage has like the first stage duplicated planes. This gives a switch in which the switch cores are efficiently used. It is also reliable and robust since only a fraction of the traffic is at most affected by a fault in a switch core and it is tolerable to multiple faults, as long as they affect different switch cores.

5 Claims, 5 Drawing Sheets

RELIABLE AND ROBUST ATM-SWITCH

The present invention relates to an ATM-switch, in particular a large ATM-switch.

BACKGROUND

The use of ATM-networks in particular as transport networks is more and more expanded owing to their versatile capability of transmitting information at varying speeds and with different priorities, where the information can be derived from sources having very different characteristics and needs. In large such networks there is naturally a need for very fast switching which must be performed in the switching nodes of the network since the amount of information that is to be handled in each switching node is significant. Also, in such large networks each node can be connected to a large number of other nodes and there will then be need for fast switches which are also capable of switching data cell streams between a large number of inputs and a large number of outputs. Such switches must also be reliable and it must be ensured that cells are not lost.

Switches or switching units used in or constituting a node of a network may be constructed as a single switch element or switch core. A general problem with a switch containing a single switch core is that if some part of the switch core is faulty, all traffic flowing through the switch will be affected. A common way of solving this problem is to provide at least two identical switch cores, which in this case often are called parallel planes, to which identical cell streams are fed, and make a selection of correctly transferred cells at the egress side of the combination of parallel planes, a preferred one of the parallel plane then being used from which cells to be forwarded are taken. If one plane is faulty, one of the other parallel planes is selected as the preferred plane. The problem of using this principle in a large switch having a large number of input ports and output ports is that the probability of the occurrence of a fault is relatively high, due to the large amount of hardware required in each switch plane, and that the selection of a preferred plane from which correct cells are to be taken can not be performed without disturbing all traffic, unless some very sophisticated mechanism is used.

Another method is to use load sharing between a plurality of, say n+1, identical planes, and in such a case, if one of the load-sharing planes is faulty, the traffic is automatically distributed among the other n load-sharing planes. The switch should then be designed so that the capacity of these remaining n load-sharing planes will be sufficient to switch the full traffic through the switch.

An ATM switching system is disclosed in U.S. Pat. No. 5,471,460 having e.g. a three-stage construction comprising stages having a plurality of switch elements. A self-routing switching network is disclosed in U.S. Pat. No. 5,237,565 having a plurality of stages each having at least two switch elements. In a first stage or in first stages the incoming traffic can be evenly distributed to balance to the cell load over the different outlets. However, this distribution is only made for a special command, a "distribution" mode signal DI, in the cells.

SUMMARY

It is an object of the present invention to provide a switching unit or switch to be used in primarily an ATM-network allowing a reliable switching at a high speed and having a large number of inputs and outputs, the switching having redundancy to be used in the case of errors or failures of hardware components of the switching unit or switch.

It is another object of the invention to provide a composite, large and high speed switch built of switch elements which are commercially available.

The problem solved by the invention is thus how to provide a large switch that can operate at a high speed and in a reliable way.

Thus, a composite switch is built of a plurality of switch elements, the switch elements being arranged in at least three stages. The stages are connected serially so that a cell passing through the composite switch has to pass successively all the stages. The switch elements in a first stage work in a distributed mode switching at random received cells to outport ports of the switch elements of this stage. The switch elements of the first stage are duplicated to provide redundancy in the shape of redundant parallel planes. A cell incoming to the composite switch are by input circuits distributed to both redundant planes in the first stage and is transferred in identical copies over the planes to output ports which correspond to each other, i.e. have the same order number. A plane selection in order to select one of the identical cell copies is made after each pair of switch elements in the first stage, at each pair of corresponding output ports. This selection is made independently of each other for the different pairs of switches in the first stage. This means that if a switch element is faulty, which is the preferred switch element from which cells are taken on the output side of the pair to which this switch element belongs, a switch-over is made to the other switch element of this pair, the switch-over being made only for this pair of switch elements, so that this other switch element now is the preferred one, from which cells are taken. Thus only the traffic of cells through this pair of switch elements is affected by the switch-over and by the faulty switch element.

The switch elements in the first stage work in the distribution mode, which means, as indicated above, that an incoming cell will be switched at random to any of the outputs of a considered switch element. In second and third stages of the switch the switch elements of these stages all work in an ordinary switching mode. If a switch element in the second stage fails, the traffic will only pass through the other switch elements in the second stage. This is possible by the random distribution of cells to output ports in the first stage and by connecting a switch element in the first stage to all switch elements in the second stage, so that all switch elements in the second stage will receive cells from each switch element in the first stage. If the number of switch elements in the second stage is high, say 32, there will for a failure of a switch element in the second stage still be 31/32 of the capacity left, which is a sufficient capacity in most of the possible applications of the switch.

The second stage of the composite switch is designed as a load-sharing stage in which the switch elements work in a conventional switching mode, as indicated above, and will direct cells to the correct switch element in the third stage of the switch as controlled by some routing information such as a routing tag carried in each cell. The third stage has like the first stage duplicated switch elements or planes forming redundant parallel planes but working in a conventional switching mode like the switch elements in the second stage. In the case where one of the switch elements in a pair of parallel switch elements in the third stage fails, a switch-over is made to the other parallel plane for this pair of switch elements only, in the same way as for the switch elements of the first stage.

The principle as outlined above can generally be used in a composite switch comprising at least three stages of switch elements. If more stages are used, one or more of the middle stages, i.e. of those which are not directly connected at the ingress side or at the egress side of the composite switch, can be treated as one stage operating in a load-sharing mode, i.e. such a switching unit is still considered to be basically built of three stages. In a practical case the composite switch can thus comprise five elementary stages, the first and fifth stages having redundant planes and the second, third and fourth stages being load-sharing. Also, the input stage and the output stage can be built of substages, each working in a redundant mode having redundant parallel planes. The composite switch can then for example consist of five elementary stages, the first and second stages having redundant planes, the third plane working in a load-sharing manner and the fourth and fifth planes having redundant planes.

The advantages of the composite switch as described above comprise:

Only a fraction of the traffic is affected by a fault in a single switch element.

A reduced amount of hardware is required compared to a fully redundant switch, i.e. in which each switch element is duplicated.

It is tolerable to multiple faults, as long as they affect different switch elements.

Thus a switch is provided which has high reliability and robustness.

A switch element suitable as a building element for the composite switch as described above is the electronic circuit QSE which is available from the company IgT and can work both in a distributed mode and a switching mode.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
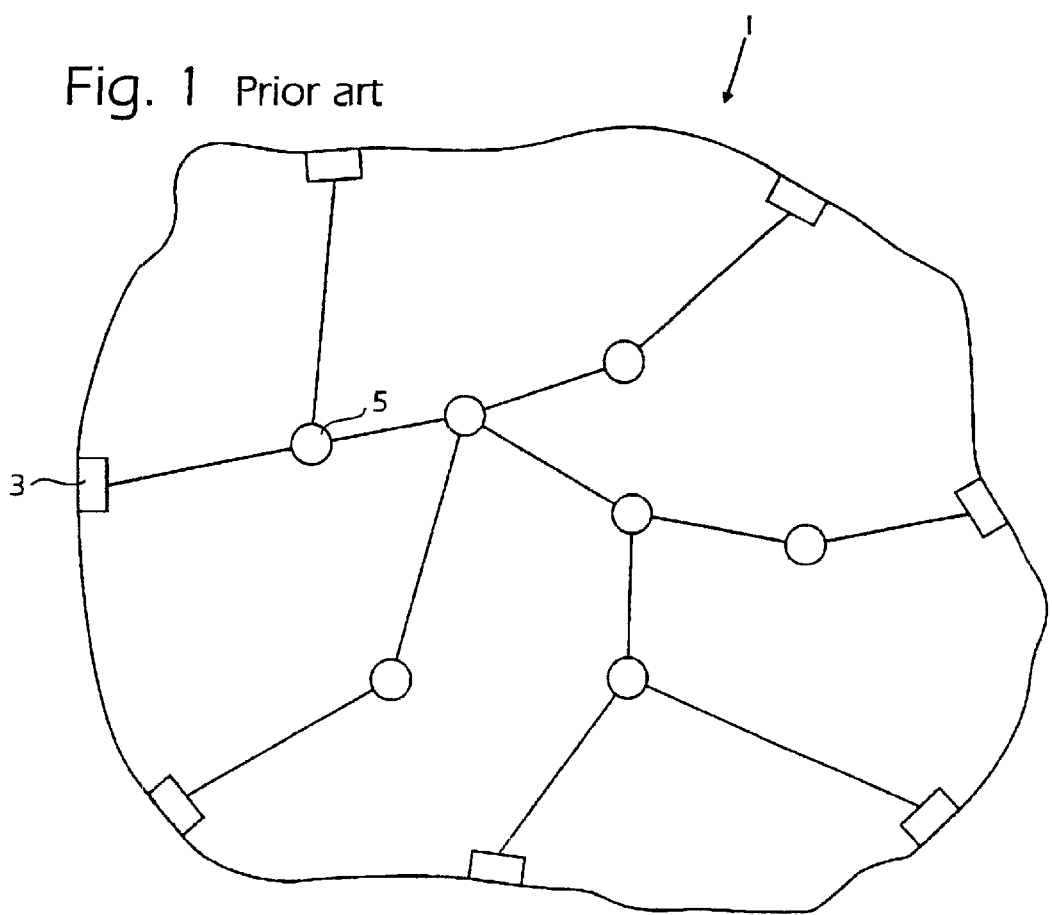
FIG. 1 is a diagram illustrating a simple prior art network.

In FIG. 1 an ATM-network is illustrated having terminals or input and output stations 3, which are connected to other network links, subscribers, etc. Each terminal 3 is connected to an ATM-switching node 5. The nodes 5 are connected in a suitable way to each other, so that a message can be sent from each terminal 3 to each other terminal of the network or to itself.

In the schematic example of FIG. 1 each switching node is connected to a small number of other nodes 5 or terminals 3 but in more complicated networks a need will exist for nodes which can switch messages between a large number of input and output ports of the nodes.

Large switches can be constructed from smaller switch elements, the smaller switch elements having in turn a small number of input ports and output ports, between which they can switch cells in a data cell stream at a very high speed. Some of the processing inside such elementary switches will then always be performed in a parallel way, see e.g. the published International patent application WO 96/36196, whereas the communication between switches is instead performed in a serial way as is the standard way used within the ATM concept. Such a switch element or switch core is the circuit QSE having a product identification WAC-488-A and manufactured by the company IgT, Integrated Telecom Technology, Inc.

The QSE circuit has 32 input ports and 32 output ports operating at a bit rate of 264 Mbit/s each. Inputs and outputs of the QSE-circuit can be arranged by means of the circuit QRT having the product identification WAC-487-A obtained from the same company IgT. A QRT has four input ports and four output ports which operate at 264 MBit/s and which can be connected to the same QSE or to different QSEs in the composite switch.

A QSE can operate in two different modes, a distribution mode and a switching mode. In the distribution mode, the QSE will take cells from its input ports and distribute them at random to its output ports, without considering any possible routing information in the cells. Thus, a cell arriving to a QSE will be forwarded from the QSE on an arbitrary one of the outputs thereof, according to a random pattern. The random pattern used will minimize the risk for collision of cells in later stages of the switch fabric in which a QSE operating in the distribution mode is included. A QSE operating in its switching mode will route incoming cells to its output ports as determined by a routing tag in the header of each cell. Thus, a cell arriving to a QSE working in its switching mode will be sent through the QSE to a definite one of its output ports. In the case where more than one cell is routed to the same output port, that cell is forwarded which has the highest priority, as given by e.g. a priority tag in the header of a cell, the other cell or possibly cells having lower priorities being discarded. Each cell can be assigned one of three priorities, high, medium or low priority. If more than one cell having the same priority are routed to the same output port, one of the cells is selected at random and forwarded and the other cell or cells is/are discarded. The latter procedure can be used also in the case where no explicit or implicit priorities exist in the network.

When a cell is discarded in the priority selection, this event also being called a collision as mentioned above, the QSE can be configured to send a negatively acknowledging signal NACK back to a preceding stage of the switch network, in which the QSE is included. The negatively acknowledging signal NACK is a simple signal transmitted in the backwards direction along the same path as that travelled by the cell which was discarded and thus to the input step of several successively connected QSEs. Thus, a QSE operates to receive such negatively acknowledging messages from QSEs located downstream and to forward them in the backward direction, to a preceding QSE. The messages are routed to the correct input port, in which a copy of the discarded cell is stored in an input buffer. Also from the output step or egress step of connected QSEs a similar but positively acknowledging message can be sent backwards through the sequence of QSEs in the same way, following the path of the received cell in the inverse direction.

The circuit QRT is designed to operate as an input unit and as an output unit of a switch core element of type QSE. It can thus perform the buffering which is necessary when receiving ATM-cell streams on an input line. The cells are in a QRT stored in buffers, one buffer being arranged for each logical connection, and the QRT can be configured to translate the number of a logical connection to other information such as routing tags needed in later stages of the switch for switching cells to the correct output port of the composite switch. Cells belonging to the same logical connection will always be transmitted from an input QRT on the same output port thereof, this port being selected when the logical connection is set up.

The QSEs and QRTs are designed to operate at high speed allowing, in a suitable combination of these circuits, that they will form a switch fabric, in which cells can be transmitted at one cell time and a positively acknowledging message be sent backwards through the switch from the egress side to reach the ingress units before the next cell time, i.e. during the same cell interval. Also, negatively acknowledging messages can be sent from a switch element in a stage at each time when a cell is discarded and these negatively acknowledging messages will also be received by the ingress units before the next cell time. For supplying redundancy, each switch element or switch core QSE can in specific cases be duplicated so that a standby plane is obtained for each QSE. In that case, copies of the same cell are transferred in parallel and independently in the two planes of such a pair of QSEs. At the egress side of such a redundant pair of QSEs some simple selection method is used for determining at each instant a preferred plane from which cells transmitted through the pair are forwarded to the next stage.

Figure 2:
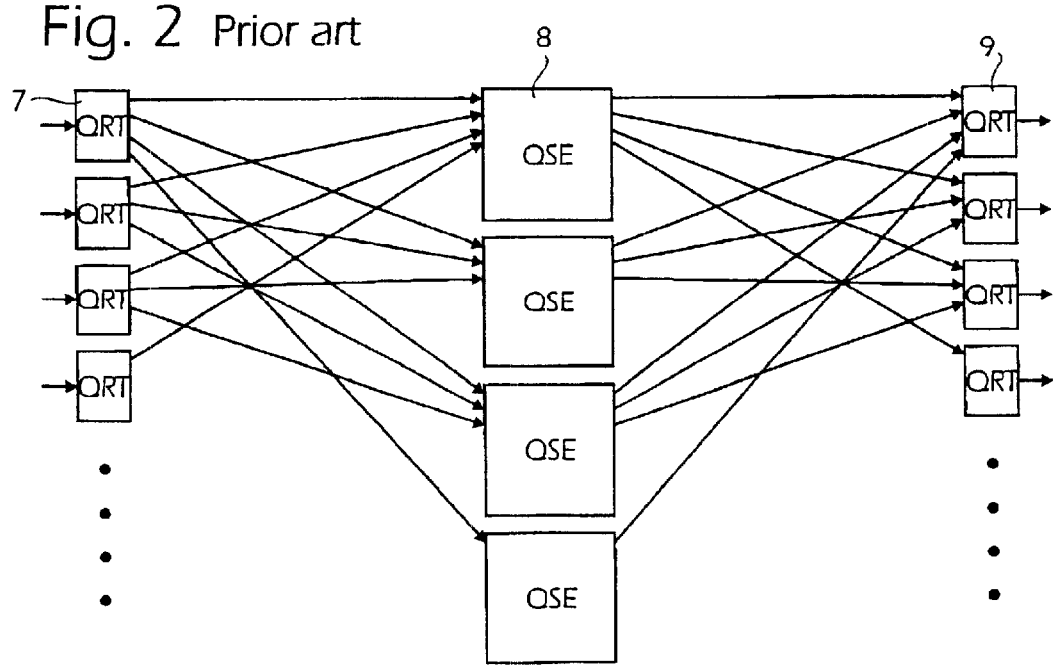
FIG. 2 is a block diagram illustrating a load-sharing prior art switch built of four switch cores.

The QRT/QSE combination of circuits can in the conventional way be used in configurations including two redundant, parallel switching planes but also in a 4-plane load-sharing configuration, as illustrated in FIG. 2. Thus 32 QRTs 7 operate as input units and each of the four outputs of every QRT is connected to a separate one or an own one of four QSEs 8 forming the load-sharing stage. 32 QRTs 9 work as output units and are each one connected to every one of the QSEs 8. In this configuration, if one of the load-sharing cores or planes 8 fails, there is only ¾:th of the capacity left, which is a too significant reduction of the switching capacity. Such a reduced capacity can in most cases not be accepted for high capacity networks.

However, a composite switch can be built having QSEs in three stages using a load-sharing configuration of 32 QSEs in the middle stage. If a QSE in the middle stage fails, for the cells directed to this QSE no positively acknowledging signals will be issued and thus these cells will be retransmitted from the input units. Due to the random distribution in the first stage, all cells will eventually be routed to one of the remaining 31 QSEs and switched to the correct output. If the number of QSEs in the middle stage is 32, there will still be 31/32 of the switching capacity left, which is acceptable in most cases.

A composite switch as outlined above can be assumed to be clocked by both a bit clock signal having a very high rate and a cell clock signal having a lower rate, the interval between each cell clock signal being called a cell interval and comprising a definite number of intervals between bit clock signals, i.e. the cell clock signal occurring each Mth bit clock signal where M for the case of using QSEs and QRTs is equal to 118. The time at which a cell clock signal occurs is called a cell time and the time at which a bit clock signal occurs is call a bit time.

Figure 3:
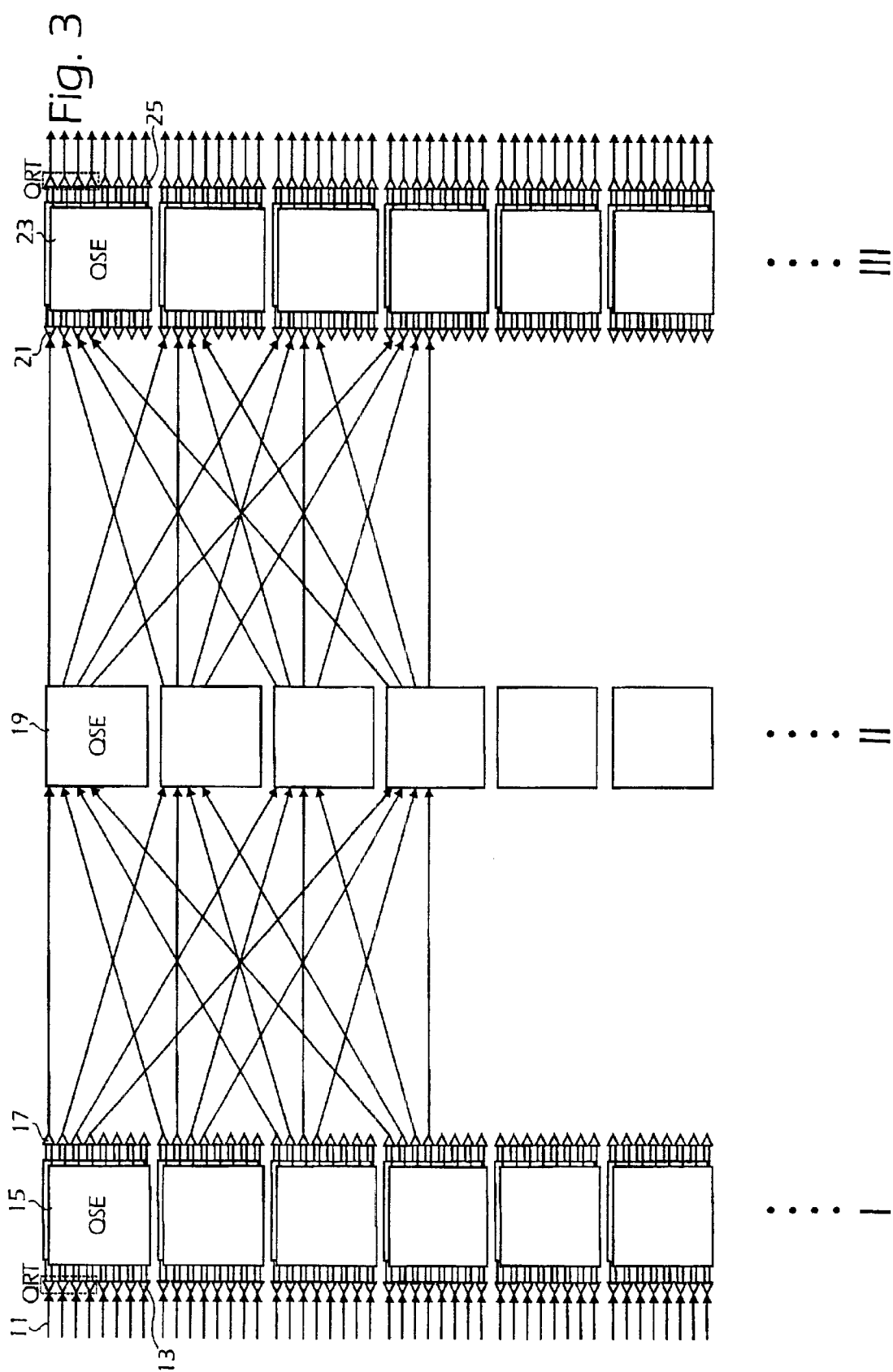
FIG. 3 is a block diagram of a switching unit having a large number of inputs and outputs using both duplicated switch cores and load-sharing for achieving redundancy.

Thus, in FIG. 3 an ATM-switch is shown built mainly of the circuits QSE and using a load-sharing configuration as indicated above. For simplicity the QSEs in each stage are illustrated as having only eight input and output ports and only a few links between the QSEs in the three stages are drawn. The number of QSEs in each stage where redundant QSEs are not considered can be up to and including 32 and the number of links between each pair of a QSE in one stage and a QSE in the next stage can be up to and including 32, since the number of input and output ports of a QSE is 32. Of course, the same basic design can be applied to circuits similar to QSE having an arbitrary number of inputs and outputs. The switch comprises three stages I, II, III. As seen in the data flow main direction, the first stage I has QSEs operating in their distribution mode, and in the middle stage II and in the third, final stage III the QSEs are all operating in their switching mode. The first stage and third stages can be substantially identical to each other except that the included QSEs work in different modes.

In the first stage I the QSEs are arranged to provide redundancy by providing for each QSE a parallel QSE operating independently thereof, all QSEs in this stage thus being arranged in pairs, in the full configuration 32 pairs. Cell streams enter at input lines 11 to distributing input circuits 13, each input circuit being connected to an input port of a QSE 15 and to the corresponding input port having the same order number and belonging to the other QSE 15 in a pair. The distributing input circuits 13 perform the necessary buffering of incoming cells and thus have sufficiently large buffer memories. The input circuits 13 can be built of the circuit QRT from IgT, each QRT then including or corresponding to four distributing input circuits 13, see also FIG. 4. Each received cell incoming to the composite switch is by an appropriate one of the input circuits 13 distributed to those two parallel QSEs 15 which are connected to this distribution circuit 13. The output ports of the QSEs 15 are connected to redundancy terminating units 17, each redundancy terminating unit 17 being thus connected to one output port of a QSE 15 and to the corresponding output port of the parallel QSE. The redundancy terminating units 17 operate in the conventional way of terminating the cell flow from redundant planes in switches and networks. All redundancy terminating unit 17 connected to the same pair of QSEs thus takes cells from a preferred one of the two parallel QSEs of the pair. A switch-over to the other QSE of the pair, making this other QSE the preferred plane, can be made at the next cell time, if necessary.

Each redundancy terminating unit 17 has its single output port connected to an input port of a QSE 19 in the middle stage II, so that each redundancy terminating unit 17 of two parallel QSEs 15 in stage I is connected to an own one of the QSEs 19 in the middle stage II, i.e all the redundancy terminating units 17 of a pair of QSEs 15 are connected to different QSEs 19 in stage II.

The output ports of the QSEs 19 in the middle stage II are through distribution circuits 21 connected to QSEs 23 in the third or final stage III, the QSEs in the final stage being, like the QSEs 15 in the first stage I, arranged in redundant pairs, so that there are 32 such pairs in stage III. The output ports of a QSE 19 in the middle stage II are all connected to different ones of the pairs of parallel QSEs in stage III, a QSE in stage II thus having a connection with each one of the pairs of QSEs in stage III. The distribution units 21 are similar to the distribution units 13 of the first stage I. Thus, they send a copy of a cell simultaneously to the two parallel QSEs 23 of a pair in the third stage III. Redundancy terminating units 25 identical to the redundancy terminating units 17 in the first stage I are connected to the output ports of the QSEs 23 in stage III in a way similar to that of stage I, such a redundancy terminating unit 25 thus being connected to only one of the output ports of a QSE 23 in stage III and to the output port having the same number or being the corresponding one of the QSE 23 in the same redundant pair of QSEs in stage III. The redundancy terminating units 25 deliver the output streams of cells which have been transferred through the total composite switch, for example to QRTs, not shown.

The ATM composite switch as illustrated in FIG. 3 operates in the following way. A cell incoming on an output line 11 belongs to a logical connection Having some VP/VC-number as in the ATM standard. The cells are buffered or stored temporarily in the distribution input circuits 13 in which their connection information is translated to routing tags using e.g. table-lookups and inserted in or added to the cells. From the distribution ports 13 the cells are transmitted to the QSEs 15 in the first stage I, a copy of a cell being input to each of the two QSEs in a redundant pair. In this first stage I, in which the QSEs operate in their distribution mode, the two copies of a cell are transmitted to an arbitrary one of the output ports of each QSE 15 in a redundant pair, but only one cell copy is selected and forwarded, that cell copy which arrives on the QSE preferred at the considered instance. From a redundancy terminating unit 17 of the first stage I the cell is forwarded to that QSE 19 in the second stage II which is connected to the considered redundancy terminating unit. As has already been described, the cells have in some earlier stage, such as in the input distributing input ports 13, been provided with suitable routing information such as routing tags, added to or inserted in a header of a cell. This information is used by the QSE 19 in the second stage II for transmitting the cell to the desired or selected one of the outputs thereof. The cell is then forwarded to that distributing unit 21 in the third stage III, which is connected to the selected output port of the QSE 19 in the second stage II. The distributing unit 21 transmits the cell simultaneously to the two redundant or parallel QSEs connected to the outputs of this distributing unit 21. In the QSEs 23 in the third stage III the cell is then transmitted to a definite one of the output ports of the QSEs in the considered pair of QSEs 23, also as determined by the routing information for the cell.

At each cell time, the distributing input circuits 13 will each select a cell and transmit it to the two QSEs 15 connected to it. If QRTs are used as input circuits, during each cell interval or at each cell time, a QRT will select four logical connections from each of which a cell is taken and then the QRT will transmit these four cells to those output ports which are determined for each logical connection, each output port also having facilities for distributing two identical copies of a cell to the two planes QSEs of a redundant pair connected to it. However, each line between QRTs and QSEs and between QSEs, see FIGS. 3 and 4, will in fact comprise four parallel lines. That means that in one bit clock cycle four bits are transmitted through the switch and thus in one cell interval 4·118=472 bits are transmitted, i.e. a cell will for the specific use of QSEs and QRTs always consist of 472 bits.

The switch cores, i.e. the QSEs 15, 19, 23, have principally no buffering facilities for cells of the kind considered here. The buffering is instead assumed to be only made at the input of the switch, in the input circuits 13 such as QRTs. If a considered input circuit 13 such as a QRT when transmitting a cell during a cell interval does not receive a positively acknowledging signal ACK during the same cell interval, the input circuit will keep the cell in its buffer and resend it at a later time. Otherwise, i.e. if a positively acknowledging signal is received, the cell is deleted from the buffer in which it is stored in the input unit and a new cell is selected for transmission in the next cell interval. The positively acknowledging signals ACK are issued at the egress side of the composite switch, by the output circuits 25 such as egress side QRTs, whenever such a circuit receives a correct cell. The positively acknowledging signals are transmitted backwards through the composite switch along a path parallel to the path along which the cell has travelled to its destination output circuit 25, this path being set up and arranged by special means inside the QSEs in the path of the cell. The circuit QRT has built-in facilities for sending such positively acknowledging signals ACK so that it can be used to build the redundancy terminating units 25 of the final stage III.

By the transmission of both acknowledging and negatively acknowledging signals a redundancy of the fault monitoring is obtained. Possibly also the negatively acknowledging signals can be designed to be characteristic of the stage from which they are issued, so that the negatively acknowledging signals obtained from stage II are different from those issued by stage III. This will be helpful in monitoring faults in individual devices.

However, as has already been discussed, a selection of plane must also be made for routing the acknowledging signals ACK and NACK, i.e. if the QSEs in the middle stage II selects cells from a considered QSE i the first stage I, also the QRTs at the input side select the acknowledging signals from this QSE. Generally, the selection of a preferred plane is assumed to be controlled by a processor, not shown, commanding a pair of QSEs and a QRT connected to the pair to select acknowledging signals from a preferred QSE of the pair. The preferred plane used for transmitting acknowledging signals will then be the same as used for cell transmission in the downstream direction.

Collisions between cells may occur in a QSE in stage II and III when at the same time at least two cells are switched to the same output port. Then only one of the cells is selected and the other cell or cells is/are dropped or discarded. Then a negatively acknowledging signal NACK can be generated by the QSE in which the collision occurred and be transmitted backwards, in the same way as a positively acknowledging signal ACK, through the composite switch along a path parallel to that of the cell. The positively and negatively acknowledging signals are all received by the input circuits of the composite switch, i.e. by the distributing input circuits 13 of the first stage I. If a negatively acknowledging signal is received by an input circuit 13, it will retransmit the cell during the next cell interval or possibly later, depending on the queuing situation in the input circuit QRT. The circuit QRT is specially designed for receiving positively acknowledging/negatively acknowledging signals and also for making such retransmissions of cells.

Figure 4:
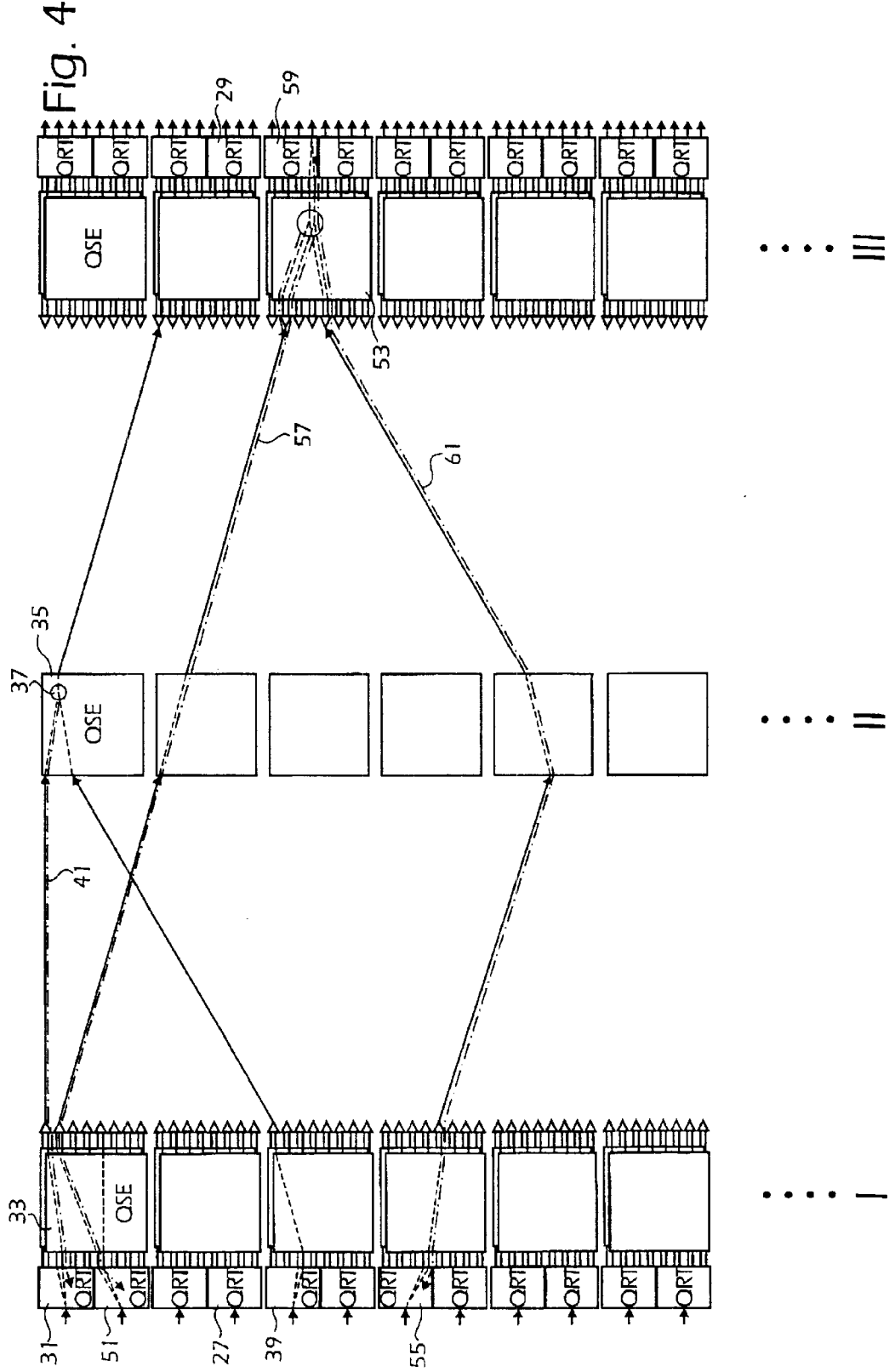
FIG. 4 is a block diagram similar to that of FIG. 3 showing other input and output circuits and the paths of positively and negatively acknowledging messages.

In the block diagram of FIG. 4 the distributing input circuits 13 are replaced by QRT circuits 27 and the output terminating units 25 by QRT circuits 29. Here are also illustrated some possible collision situations and the paths of acknowledging messages.

Thus for example, a cell is sent from the first input QRT 31 and happens to be distributed to its second output. The cell is then transmitted in identical copies through the first pair of QSEs 33 in stage I. The cell copy transmitted to the first QSE of the pair happens to be distributed to its first output. The cell copy is then sent to the first QSE 35 in stage II, in which it is routed to the second output thereof. A collision situation occurs here, as indicated by the circle 37, since a second cell originating from another input QRT 39 has during the same cell interval been switched to the same output of the first QSE 35 in stage II. The second cell is selected and the first considered cell is lost. A negatively acknowledging message NACK is then transmitted from the place where the collision occurred, thus from the first QSE 35 in stage II, back along a path 41, indicated by a line of dashes and dots and being parallel to that of the lost cell, back to the input circuit QRT 31 from which the cell was originally transmitted.

Similar collisions can also occur in stage III. For example, a first cell distributed by the second input QRT 51 can be transmitted to the third pair of QSEs 53 of stage III, to which QSEs 53 a second cell transmitted from another input QRT 55 arrives during the same cell interval. The first cell is lost in both planes of the pair and then a negatively acknowledging message or signal NACK is sent back from both planes along a path 57 parallel to the path of the lost cell. The not lost or selected second cell copies are switched to the output QRT 59, in which one of the copies is selected. This output circuit then generates a positively acknowledging message ACK which is retransmitted along a path 61 parallel to that of the selected cell copy, which is received by the input QRT 55. When receiving this message, the cell is removed from a buffer, not shown, in the input circuit 55.

Figure 5:
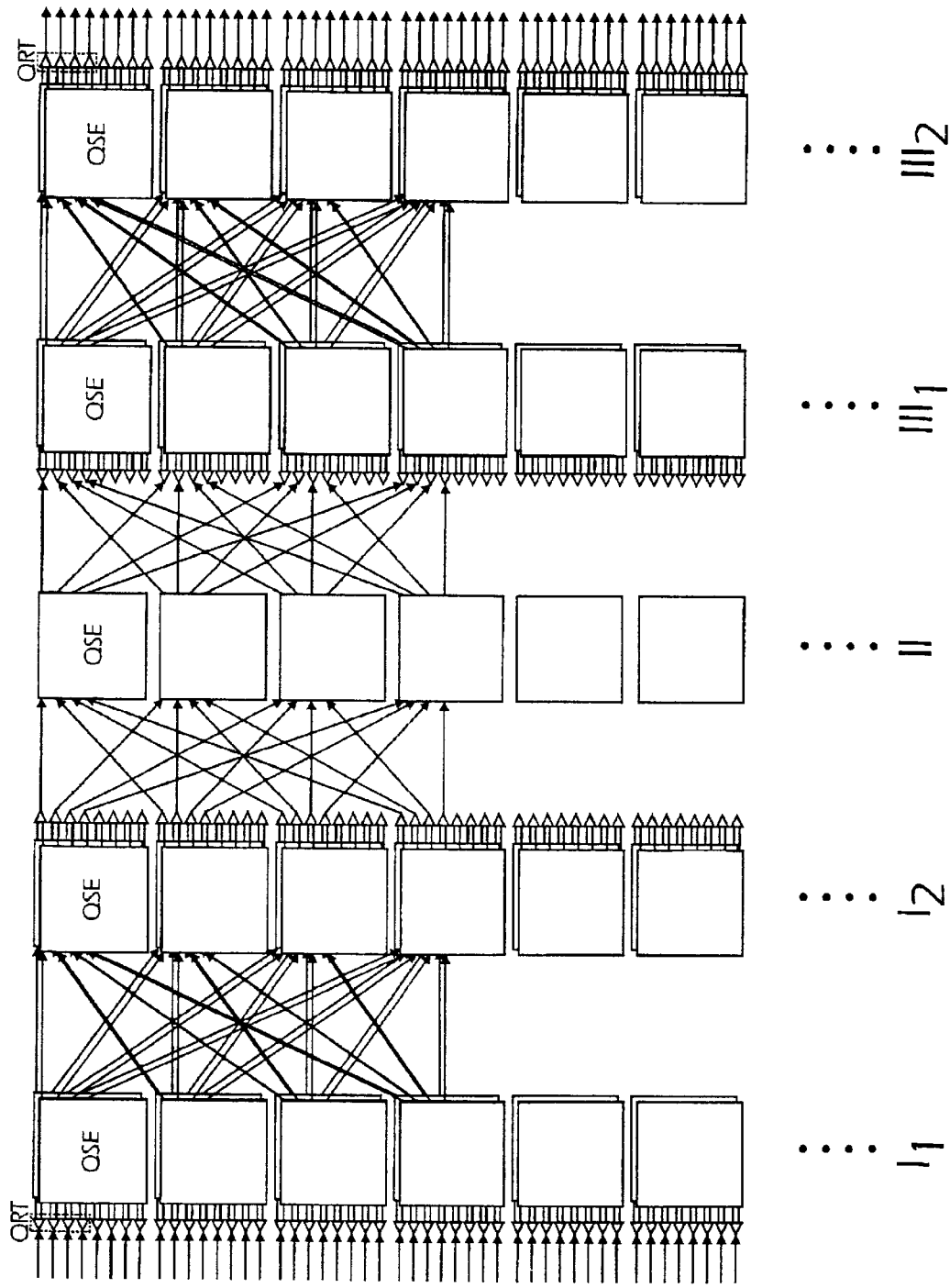
FIG. 5 is a block diagram of a switching unit similar to that of FIG. 3 but having five substages.

The general layout of a composite switch having a middle stage which is load sharing and end and stages working in a redundant mode can be implemented using more stages of switch elements. Thus, in FIG. 5 a composite switch is illustrated having five stages. The two first stages $I_1$, $I_2$ each consist of switch elements comprising two parallel planes and the two last stages $III_1$, $III_2$ also each consist of switch elements having two parallel switching planes, at the output side of two redundant, parallel planes a plane selection always being made. The first and second stages $I_1$, $I_2$ then transmit an incoming packet to a random one of its output terminals, whereas a routing to a definite output terminal is made in the other planes II, $III_1$, $III_2$.

Figure 6:
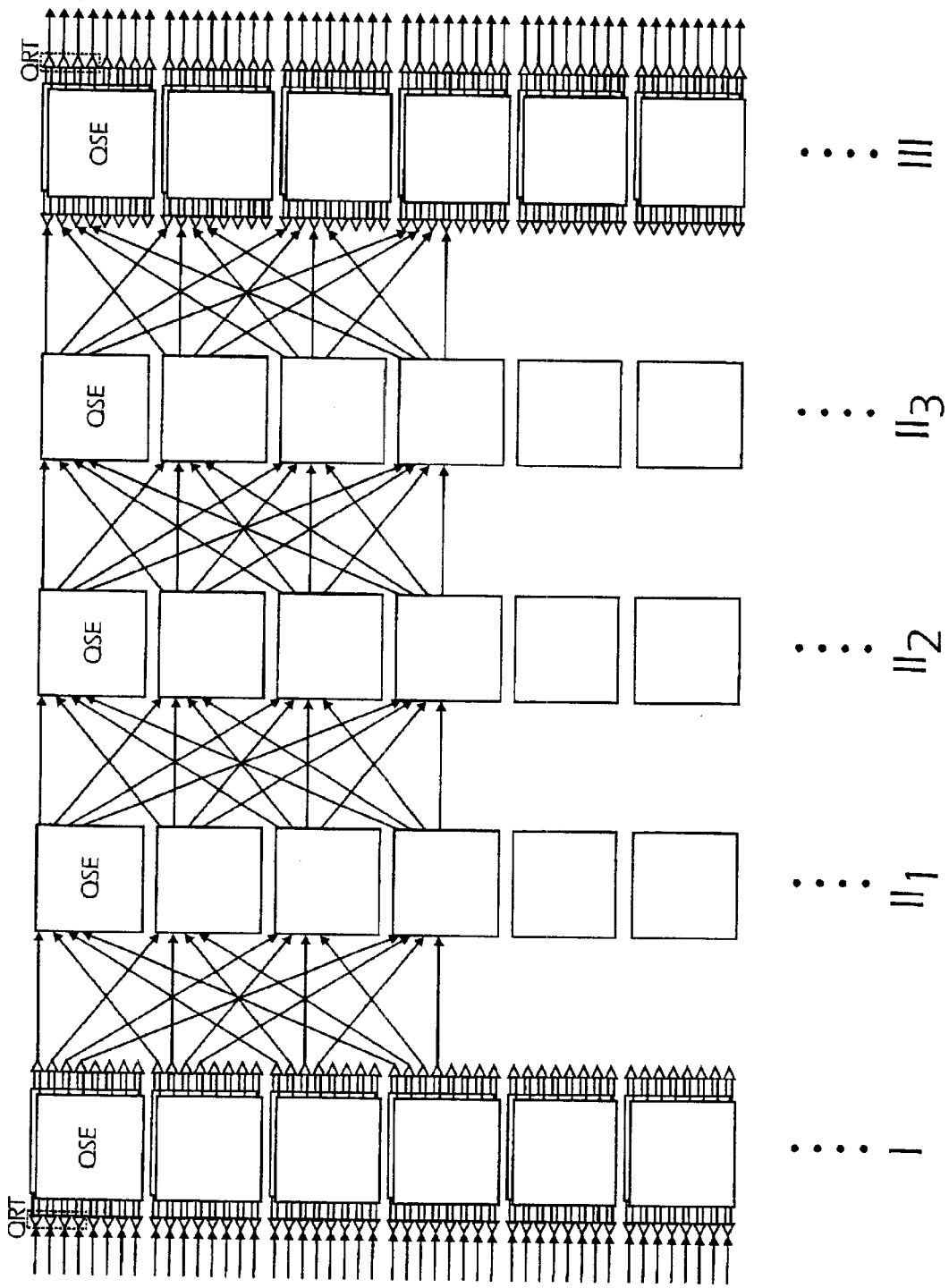
FIG. 6 is a block diagram of an alternative switching unit having five substages.

Also the middle load-sharing stages can be more than one. Such a layout is illustrated in FIG. 6. Here the middle stage consists of three substages $II_1$, $II_2$, $II_3$ which each work in a load-sharing mode. The first two stages/substages I, $II_1$ also here work in a distributing mode, transmitting an incoming packet to a random output terminal. The later stages/substages $II_2$, $II_3$, III are arranged to route the data packets to a definite one of their output terminals.

Thus, a composite switch has been described which is in a simple way built from substantially standard components and which has a high degree of reliability and transport flow.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A composite switch for switching cells incoming to the composite switch to output ports of the composite switch, the composite switch comprising:

a first stage comprising first switch elements having a plurality of input ports and a plurality of output ports, the first switch elements being arranged to distribute a cell incoming to one of its input ports to one of its output ports, said one of its output ports being selected at random;

a second stage comprising second switch elements and a third stage comprising third switch elements, each of the second and third switch elements having a plurality of input ports and a plurality of output ports and each of the second and third switch elements being arranged to switch a cell incoming to one of its input ports to a definite one of its output ports, as determined by information in regard of each cell switched through the switch element;

output ports of the first switch elements being connected to input ports of the second switch elements, so that at least one output of each first switch element is connected to one input port of each second switch element;

output ports of the second switch elements being connected to input ports of the third switch elements, so that at least one output of each second switch element is connected to one input port of each third switch element; and wherein each first switch element comprises at least two parallel planes which work independently of each other and wherein redundancy terminating units are connected to the output ports of the first switch elements for selecting cells from only one of the at least two parallel planes.

2. The composite switch of claim 1, wherein each third switch element comprises at least two parallel planes which work independently of each other and wherein redundancy terminating units are connected to the output ports of the third switch elements for selecting cells from only one of the at least two parallel planes.

3. The composite switch of claim 1, wherein the first stage comprises at least two substages, a last one of the at least two substages comprising the first switch elements and remaining ones of the at least two substages comprising switch elements each having a plurality of input ports and a plurality of output ports, each of the switch elements of the remaining ones of the at least two substages being arranged to distribute a cell incoming to one of its input ports to one of its output ports, said one of its output ports being selected at random, output ports of each switch element of each of the remaining ones of the at least two substages being connected to input ports of the switch elements in a next one of the substages, so that at least one output of each switch element of each of the remaining ones of the at least two substages is connected to one input port of each switch element in the next one of the substages.

4. The composite switch of claim 1, wherein the third stage comprises at least two substages, a first one of the at least two substages comprising the third switch elements and remaining ones of the at least two substages comprising switch elements each having a plurality of input ports and a plurality of output ports, each of the switch elements of the remaining ones of the at least two substages being arranged to switch a cell incoming to one of its input ports to a definite one of its output ports as determined by information in regard of each cell switched through the switch element, output ports of each switch element of each of the at least two substages except a last one of the substages being connected to input ports of the switch elements in a next one of the substages, so that at least one output of each switch element of each of the at least two substages except the last one is connected to one input port of each switch element in the next one of the substages.

5. A composite switch for switching cells incoming to the composite switch to output ports of the composite switch, the composite switch comprising:

a first stage comprising first switch elements having a plurality of input ports and a plurality of output ports, the first switch elements being arranged to distribute a cell incoming to one of its input ports to one of its output ports, said one of its output ports being selected at random;

a second stage comprising at least two substages, each of the at least two substages comprising second switch elements, each of the second switch elements having a plurality of input ports and a plurality of output ports and each of the second switch elements being arranged to switch a cell incoming to one of its input ports to a definite one of its output ports as determined by information in regard of each cell switched through the switch element; and a third stage comprising third switch elements, each of the third switch elements having a plurality of input ports and a plurality of output ports and each of the third switch elements being arranged to switch a cell incoming to one of its input ports to a definite one of its output ports as determined by information in regard of each cell switched through the switch element;

output ports of the first switch elements being connected to input ports of the second switch elements in a first one of the at least two substages, so that at least one output of each first switch element is connected to one input port of each second switch element of said first one of the at least two substages;

output ports of each second switch element of each of the at least two substages except a last one of the at least two substages being connected to input ports of the second switch elements in a next one of the at least two substages, so that at least one output of each second switch element of each of the at least two substages except the last one is connected to one input port of each second switch element in the next one of the at least two substages; and output ports of the second switch elements of said last one of the at least two substages being connected to input ports of the third switch elements, so that at least one output of each second switch element of the last one of the at least two substages is connected to one input port of each third switch element.

* * * * *